July 23, 1946. H. M. BRAMBERRY 2,404,616
PISTON RING
Filed July 14, 1943
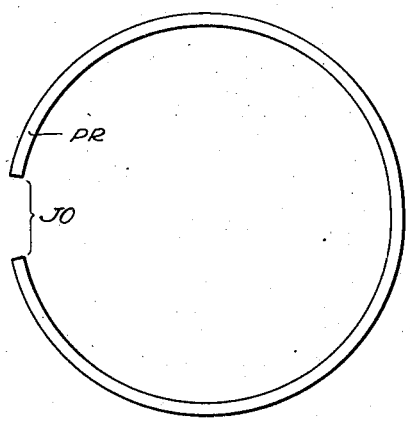
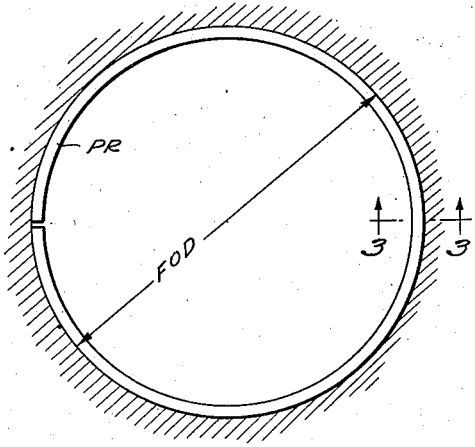
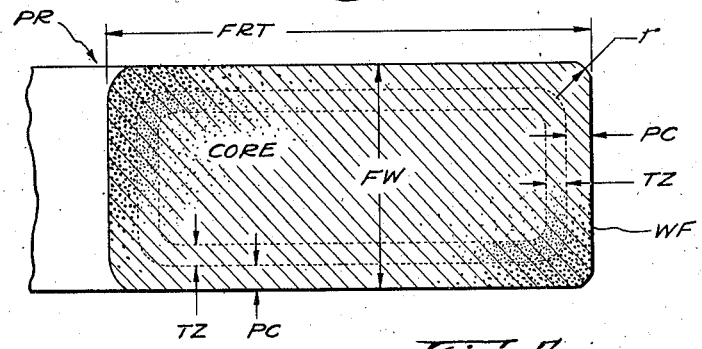
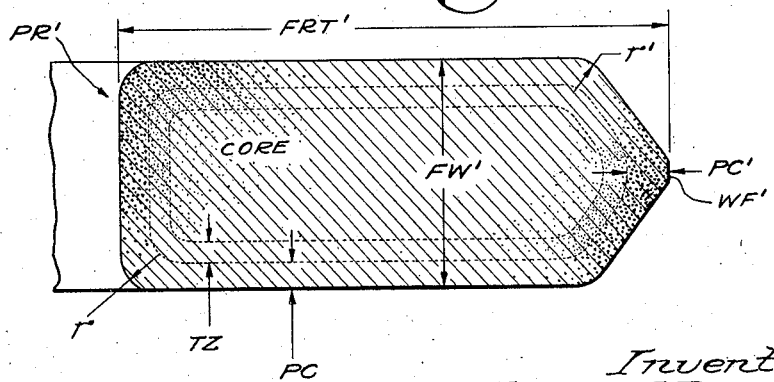
Inventor:
Harry M. Bramberry
By: Edward C. Gritzbaugh
Atty.

Patented July 23, 1946

2,404,616

REISSUED

UNITED STATES PATENT OFFICE 2,404,616

PISTON RING

Harry M. Bramberry, Oak Park, Ill.

Application July 14, 1943, Serial No. 494,615

7 Claims. (Cl. 309—44)

This invention relates generally to piston rings as articles of manufacture and particularly to a new steel piston ring especially adapted for use in internal combustion engines that must operate under high pressure and temperature conditions.

Aircraft engine builders have been confronted for some time with demands for increased power output for prolonged periods. An example of severe conditions in an aircraft engine occurs during take-off. Such increased power output demands have resulted in tremendous piston ring loads, so much so, that the piston ring currently constitutes the limiting factor with respect to accomplishing further increase in power output. This is especially true if increased output is to be realized without an accompanying appreciable reduction in the life and efficiency of the engine parts including particularly pistons, rings and cylinders.

It has been proposed heretofore to manufacture piston rings of steel. However it is not believed that a piston ring has ever been fabricated from steel, coming within the range of proportions herein disclosed and capable of successful operation in high output internal combustion engines, especially engines required for heavy aircraft, including military aircraft. More particularly, it is not known or believed that a piston ring adapted for an internal combustion engine has ever been successfully manufactured of the particular steel and having the particular construction and physical characteristics herein disclosed and claimed.

It is an object of this invention to provide a new steel piston ring having novel, structural, physical and operating characteristics not heretofore known.

It is a more particular object to provide a piston ring of a selected steel alloy, said ring having an optimum case, core, tensile strength, hardness relation and high endurance limit, whereby to provide for prolonged and efficient operation at high temperatures and pressures.

It is a still further object to provide a piston ring having the above characteristic properties and wherein the incorporation of optimum proportions of piston ring total cross-sectional area, radial thickness, width, uniform case depth, case hardness, core hardness, and tensile strength per unit of cross-sectional area are such that the ring is caused to engage the embracing cylinder wall with the proper radial pressure throughout the circumference thereof notwithstanding high pressures and high temperatures as well as the inherently present distortions in the cylinder wall due to such high pressures and temperatures.

Another specific object is the provision of a piston ring of a selected steel alloy having formed thereon a prime hard case of requisite depth which is compatible with a wide variety of metals of which internal combustion engine cylinder walls are normally formed.

Other and more particular objects, advantages and uses of my invention will become apparent from a reading of the following specification taken in connection with the accompanying drawing which forms a part thereof and wherein:

Fig. 1 is a plan view of a preferred form of piston ring, that may be either a compression ring or an oil ring, incorporating my invention and showing the ring in free open position and indicating the free joint opening;

Fig. 2 is a plan view showing a preferred form of compression piston ring indicated schematically in position within the bore of an engine cylinder;

Fig. 3 is an enlarged cross-sectional view showing the novel and important case and core relationship in a finished compression ring ready for installation in a cylinder; and Fig. 4 is a cross-sectional view corresponding to Fig. 3 but showing an oil control ring and indicating the novel case and core relationship in a finished oil ring ready for installation in a cylinder.

I have found that a nitralloy steel, particularly that known to the trade as Nitralloy "N," possesses novel and unexpected advantages when incorporated in a finished piston ring as disclosed herein by way of preferred example. Particular attention is directed to the fact that I have reduced the cross-section of my ring to only a fraction of that cross-section heretofore employed in piston ring practice. This reduction in cross-section has been made practicable especially by virtue of the physical characteristics and properties of the structure resulting from the use of Nitralloy "N" steel when provided with the optimum uniform depth of prime hard nitrided case and core relationship herein disclosed. This reduction in cross-section in itself effects a number of important results, including first rendering the ring more flexible in order that the same may conform more completely to the irregularities or distortions within the cylinder walls as well as the irregularities in the ring grooves of the associated piston that are present at high temperatures and pressures; secondly making possible a significant reduction in ring weight with an accompanying reduction in the inertia forces; and thirdly making possible a reduction in the total number of rings required from the usual three or more compression rings to only two for each piston. The importance of the ring being sufficiently resilient to conform to the cylinder wall is particularly significant in the maintenance of satisfactory lubrication and compatibility of ring and cylinder surfaces resulting in minimum blow-by.

The employment of a steel alloy having the essential physical properties possessed, for example, by Nitralloy "N" has made it practicable to not only reduce the total cross-sectional area of the rings as compared to the cross-sectional area of the commercial rings now in use, but has also made it practicable to materially decrease the ratio of width to radial thickness. This latter reduction has the important advantage of unloading or reducing the cylinder wall engaging pressure, which has special significance in the power zone of operation of the rings. It will be apparent that the ratio of the combustion force transmitted through the ring to the cylinder wall, to that of the combustion force transmitted through the ring to the lower side of the associated piston groove, is determined essentially by the ratio of ring radial thickness to ring width. The present, relatively narrow width ring therefore, exerts a considerably reduced radial force against the cylinder wall, a larger proportion of the combustion force being imparted to the lower side of the piston groove in the axial driving direction. By virtue of the relatively small radial thickness to diameter relationship present in my particular cross-section of ring, as well as by virtue of the provision and maintenance of a hard, highly polished surface on the ring sides, the resultant friction between the ring and the lower groove side is restricted to a minimum. Therefore during the combustion period, especially when the piston is shifting in the cylinder there is not present, in my arrangement, the excessive radial force of ring against cylinder wall which in the case of conventional rings, normally results in cutting through the oil film with an accompanying wearing away of a cavity in the upper portion of the cylinder. On the contrary the ring is held against the cylinder wall with sufficient force to maintain the compression without cutting through the oil film.

By providing the ring with a prime hard nitrided outer case having substantially uniform depth, it has been found that this case is blended with the embraced underlying core through an intervening transition zone. When only a few ten thousandths of an inch have been honed from the working surface of the ring to remove the relatively loose matted outer layer, and in addition the ring otherwise finished, the same possesses almost unlimited fatigue and endurance characteristics. This resulting ring is found to operate very effectively at high engine speeds under high pressures and prolonged high temperatures while maintaining complete compatibility with the cylinder wall surface and excellent heat stability.

It has been found that all other known nitridable steels, including particularly the Nitralloys such as "B," lack the important blending between case and core through the medium of an appreciable transition zone. In Nitralloy "N" there does not exist the sharp demarkation between the physical properties of the case and the physical properties of the core that is present in the other known nitridable steels. The physicals of the Nitralloy "N" core, including particularly the tensile strength thereof are so very high as to approach the corresponding physicals of the hard nitrided enclosing case.

I have found that when a ring is made of nitrided Nitralloy "N" and given a small section of the proportions herein disclosed, there is a complete absence of chipping, cracking, or spalling of the case in service, such as has been commonly experienced in previous attempts to manufacture satisfactory nitrided steel rings of nitridable steels other than Nitralloy "N" in conventional proportions.

The success enjoyed by the herein disclosed rings is attributable in part to the provision of a core having tremendous strength and elastic limit. The tensile elastic limit of the core is of the order of 250,000 lbs./in.$^2$ and higher.

My rings have been found, as a result of actual tests, to operate for prolonged periods at military power ratings, as high as 20% above that previously consided normal take-off power. No ring either steel, cast iron, or other metal has been provided heretofore, to my knowledge, that will even approximate this performance and retain its physical characteristics as well as maintain complete compatibility with the cylinder wall.

As preferred examples of piston rings for internal combustion engines incorporating the novel features of my invention, I will describe the compression rings and the oil rings that I have built and which are operating with the herein claimed novel results in Wright-Aero-R-1820 cyclone aircraft engines. It will be understood, of course, that these novel features may be incorporated in other rings coming within the scope of my invention. These particular rings for the Wright engine are of a new construction and as above pointed out are made from Nitralloy "N." This is a commercially available alloy steel obtainable in the form of forgings from which rings may be lathe turned or in the form of cold drawn wire from which rings may be made by coiling.

The composition of Nitralloy "N" comprises C (carbon)—.20–.27%; Mn (manganese)—.40–.70%; Si (silicon) .30% max.; Al (aluminum)— 1.10–1.40%; Cr (chromium)— 1.00–1.30%; Mo (molybdenum) — .20–.30%; Ni (nickel) — 3.25–3.75%; and the balance Fe (iron), except, of course, for impurities. The exact extent to which variations in this composition of Nitralloy "N" may be permissible has not been determined; however, the specification supplied by the Allegheny Ludlum Steel Corporation and stated as conforming with the above composition has, in my experience, been found to produce rings of the desired characteristics. I, therefore, do not claim any invention in this particular steel alloy per se, but do claim to be the first to appreciate and actually establish the novel and unexpected characteristics of this metal when employed in the manufacture of split piston rings for an internal combustion or other compression engine. As will appear hereinafter, while the success of my piston ring is attributable in a large measure to the choice of Nitralloy "N" in the manufacture thereof, this metal is only partially responsible for such success, a great portion of this success being attributable to the optimum choice of cross-section as well as case, core and other relationships in the ring structure.

Referring to the figures of the drawing, the compression ring PR, that will first be described by way of preferred example, is given a finished outside diameter FOD of 6.125", a finished radial thickness FRT of .150"±.0015" and a finished width FW of .070"±.0005". In cross-section this ring is provided with a prime hard nitrided case PC of a substantially uniform depth, which is between .0055" and .0085" on the face, between .007" to .010" on the sides and .008" to .011" on the inner periphery. While I have been able to make rings to this close variation in radial thickness and prefer this, I nevertheless contemplate a somewhat more liberal tolerance as coming within the broader scope of my invention, such for example as a range of radial thickness of case on the cylinder wall engaging face not substantially outside of .0040" to .0090". These small variations (unavoidably) result from the available manufacturing technique. For example, the cylinder wall engaging face WF is necessarily finished after the ring blank has been cut, and the potting and honing operations involved do not lend themselves to the fine accuracy with which the sides PC can be readily finished. The nitrided case embraces a transition zone TZ which, in turn, encloses a core. It is of critical importance that the case depth be substantially uniform throughout below any one particular surface, i. e. it should not vary more than .003" between the maximum depth and the minimum depth before honing, and not more than .005" after honing, proceeding around the circumference of the ring.

In the event that the allowable limits are exceeded the same will be evidenced by irregular action of the ring, such for example as by opening or closing of the ends when the joint stock section is removed and hence a failure to maintain the proper free joint opening. This above uniformity largely determines other important physical characteristics including radial pressure action, requisite flatness, and conformity with the cylinder wall. The prime case hardness of this ring is of the order of Rockwell 30N-83, while hardness of the embraced core is of the order of Rockwell C-41. The two structures making up ring cross-section are blended together by a transition zone area TZ of .0035" to .0065".

From the above it will be noted that the ratio of ring width (.070") to ring radial thickness (.150") should be substantially as 7 is to 15 or more. In other words, as the radial thickness is increased for larger bore, heavier engines such, for example, as the provision of an 8½" OD Diesel engine ring of .210" radial thickness, to maintain the above ratio the width would be approximately .1.

This structural arrangement may be produced to particular advantage by a special heat treating process forming the subject matter of a separate application.

The free joint opening JO of the compression ring is 1.200" measured along the chord at the neutral axis of the radial section. The corners are rounded with a radius $r$ .012" to .015". The sides of the ring are honed to a surface finish of 2 to 5 R. M. S. (root mean square), while the face WF is co-directionally honed to a finish of 4 to 6 R. M. S. The nitrided ring with these proportions has a core of tremendous strength including a tensile elastic limit of the order of 250,000 lbs./in.$^2$.

The provision of the enclosing hard nitrided case has an additional particular significance with reference to the wearing characteristics of the rings. When exposed to severe conditions, such, for example, as dusty operation, it has been observed that as the outside of the ring, or face WF wears away, the case on the inside face of the ring functions to impart an increasing opening effect upon the ring to thus compensate for the reduced rate of pressure drop normally accompanying wear or reduction of radial thickness. In the conventional ring the tension or radial pressure varies as the cube of the radial thickness, and directly as the free joint opening. Therefore, in the absence of some compensating factor, as the ring wears from contact with the cylinder and the radial thickness is reduced, then the radial pressure characteristics are correspondingly modified and the ring eventually becomes unsatisfactory for this reason. The presence of the hard nitrided case on the inner face of my rings compensates for this condition and results in maintaining the requisite radial pressure notwithstanding wear.

The provision of this hard nitrided case on all faces enclosing a core is believed to have critical significance for a number of additional reasons. It is not believed that it has been heretofore appreciated in a small cross-section mechanically operative device having relatively moving parts such, for example, as in a piston ring, to provide a hard nitrided case on all surfaces embracing a core, which case and core relationship enters critically into the resulting operative characteristics as well as physical characteristics of the mechanism. The provision of this case and core relationship is believed to account for the wider range of possible free joint openings that can be employed for the same cross-section of ring. It has been found that a ring section of the order of that herein disclosed may be utilized for cylinders of as large as 7.5" OD with a free joint opening as high as 3", having a cylinder as small as 5" OD with a corresponding free joint opening where the combustion chamber pressures are 800 to 1,600 pounds per square inch and the operating speeds are of the order of 500 R. P. M. and above. It will also be noted that in view of the relatively large free joint opening my rings may be assembled over the piston without requiring that the ends of the same be spread apart.

The result of the above structural relationships and properties is the provision of a ring having an almost unlimited fatigue endurance limit under prolonged high temperatures and high pressures while the same maintains compatibility with the cylinder wall surface. This is found to be true even with prolonged operation at military power as high as 20% above that previously considered normal take-off power in the case of a Wright R-1820 engine. In arriving at this percentage of improvement, I have taken the normal 210 pounds BMEP at a maximum of 1,200 pounds per square inch chamber pressure at take-off power of the Wright cyclone R-1820 engine, and I have compared this value with the values I have obtained by the use of the herein disclosed rings. In the case of the Wright cyclone engine, by installing my rings therein, I have been able to operate not only for a brief take-off period but continuously at as high as 250 pounds BMEP. In the case of a continental high output military aircraft engine, I have successfully operated the engine continuously at 300 pounds BMEP at a maximum combustion chamber pressure of 1,600 pounds per square inch. A comparison of this result with the above normal take-off power output of 210 BMEP gives a 40% increase in BMEP. No piston ring of the compression type has been provided heretofore, that will operate for prolonged periods at take-off power in conjunction with cylinder wall surfaces up to 500° F. More particularly, it is believed the herein disclosed piston ring is the first successful Nitralloy "N" piston ring of substantially rectangular cross-section having a finished nitrided case on all surfaces of a predetermined uniform depth below each of the respective surfaces, the ring having a relatively small cross-sectional area in relation to the cylinder diameter. The present example being an aircraft engine compression ring of 6.125" outside diameter, and .150" radial thickness and .070" width.

The present example of an oil control piston ring PR' has the same outside diameter 6.125" and width FW' as the compression ring PR but is .170" in radial thickness FRT' and has a free joint opening of 1.500" measured along the chord on the neutral axis (not shown). In addition, the oil ring is given a converged or reduced flat contact or working surface WF' with the cylinder wall of .010" to .020" in width. The corners are rounded with an arc of a radius $r$ on the inside which is the same radius as that of the compression ring corners namely .012" to .015". The outside corners are rounded with an arc having a radius $r'$ of .010" to .012". The oil ring is hatch-honed to 5 to 8 R. M. S.

The oil control ring PR' is given the same prime hard case depth PC as that of the compression ring PR except that below the narrow working face WF' the case PC' is several thousandths of an inch deeper. This results from the converged construction of the working face of the oil control ring and is important as there exists an initial wear on this narrow face WF' during the period required for the compression rings to attain proper oil control. The two sets of rings, therefore, complement one another in that the oil rings perform the maximum oil control function when first installed and as the compression rings gradually "wear-in" and improve in their oil control function, the oil ring faces gradually increase in area as they "wear-in" until the rate of wear of both sets of rings balance and give the desired combined oil control. All heretofore known ring combinations have what may be referred to as an increasing rate of wear from the very beginning after installation. Conventional piston ring combinations normally "wear-in" at a fast rate requiring only about twenty hours to reach maximum efficiency, following which the same enjoy a short period of life only. On the other hand, my compression ring and oil control ring combination shows an inverse rate of "wear-in" which is evidenced by the long period of time during which the above-described balanced condition prevails. I find that it is not at all uncommon for the above balanced condition to prevail after one hundred and fifty hours of operation. As a typical example of the oil consumption, I have found that the same is somewhat greater initially, but is followed by a continued reduction thereof even after one hundred and fifty hours, this time phenomenon being explained by the above-described mode of "wear-in." A typical example of a Wright R-1820 engine equipped with my compression and oil rings shows an oil consumption of .015 pound per brake horse power per hour at the beginning of operation, .009 pound per brake horse power per hour at 75 hours, and .006 pound per brake horse power per hour at 150 hours, all at rated power.

The above compared with the same model engine equipped with commercially available rings was found to show an oil consumption at the beginning, as low as .004 pound per brake horse power per hour with a gradual increase in oil consumption as the rings "wore." The rings rapidly became feathered under the identical conditions under which my rings operated quite satisfactorily, including high output and dusty conditions. In addition these rings showed a rise in oil consumption as high as .05 pound per brake horse power per hour in less than twenty-five hours. My oil control ring likewise has a core possessing a tensile elastic limit of the order of 250,000 lbs./in.$^2$, and a hardness of case and core corresponding to that of the compression sealing ring.

There are no special requirements involved in the installation of the present rings, there being no distinction between the top or bottom of either the oil or the compression types. Two rings only of each type are required per piston in the usual installation, thus reducing the total of six rings previously required to only four where my ring is employed.

It has been found that my rings will operate satisfactorily in all respects at a BMEP (brake mean effective pressure) up to 300 pounds per square inch without scuffing, feathering or abrading away, or breaking, this having been found to be true at ring temperatures as high as 550° F.

The preferred embodiment of my invention has been described as including a hard nitrided enclosing case, and while I prefer this in production because of the superior performance where the rings must meet the most exacting conditions, I nevertheless contemplate, as coming within the broader aspects of my invention, rings made of Nitralloy "N" generally. As an example of such ring I contemplate, as coming within my invention, a Nitralloy "N" piston ring which has been heat-treated in a non-oxidizing atmosphere to provide the same with the requisite physicals, including hardness and high heat stability and satisfactory endurance limit, but which has not been nitrided to give the same a hard nitrided case. I have found that such a nitralloy ring may be readily plated as, for example, by the chrome process to give the same a wearing surface. These plated rings while superior to any rings previously available are nevertheless far from equal to the above-described preferred embodiment of rings incorporating the hard nitrided case and core relationship.

While I have disclosed my invention in connection with certain specific embodiments thereof, it is to be understood that this is by way of illustration and not by way of limitation and the scope of my invention is defined solely by the appended claims which should be construed as broadly as the prior art will permit.

I claim:

1. A split piston ring having a core formed of an alloy steel having substantially the composition .20–.27% C; .40–.70% Mn; .30% max. Si; 1.10–1.40% Al; 1.00–1.30% Cr; .20–.30% Mo; 3.25–3.75% Ni, surrounded by a prime hard nitrided case which is blended to the core through an intervening transition zone.

2. A split piston ring having a core formed of an alloy steel having substantially the composition .20–.27% C; .40–.70% Mn; .30% max. Si; 1.10–1.40% Al; 1.00–1.30% Cr; .20–.30% Mo; 3.25–3.75% Ni, surrounded by a prime hard nitrided case of substantially uniform depth which is blended to the core through an intervening transition zone.

3. A split piston ring having a core formed of an alloy steel having a hardness of the order of Rockwell C-41 surrounded by a case having a hardness of the order of Rockwell 30 N-83 which is blended to the core through an intervening transition zone.

4. A split piston ring having a core formed of an alloy steel having a tensile elastic limit of the order of 250,000 p. s. i. surrounded by a prime hard case having such physical properties that the tensile elastic limit of the core approaches that of the case.

5. A split piston ring of substantially rectangular cross-section having a core formed of an alloy steel having substantially the composition .20-.27% C; .40-.70% Mn; .30% max. Si; 1.10-1.40% Al; 1.00-1.30% Cr; .20-.30% Mo; 3.25-3.75% Ni, surrounded by a prime hard nitrided case which is blended to the core through an intervening transition zone and having a ratio of ring width to ring radial thickness of 7 to 15 or more.

6. A split piston ring having a core formed of an alloy steel having substantially the composition .20-.27% C; .40-.70% Mn; .30% max. Si; 1.10-1.40% Al; 1.00-1.30% Cr; .20-.30% Mo; 3.25-3.75% Ni, surrounded by a prime hard nitrided case which is blended to the core through an intervening transition zone, said ring having a free joint opening sufficiently large to permit assembly over the head of a piston with which the ring is designed to be used without increasing the size of the free joint opening.

7. A split piston ring having a core formed of an alloy steel having substantially the composition .20-.27% C; .40-.70% Mn; .30% max. Si; 1.10-1.40% Al; 1.00-1.30% Cr; .20-.30% Mo; 3.25-3.75% Ni, surrounded by a prime hard nitrided case which is blended to the core through an intervening transition zone and having opposed sides, a cylindrical cylinder engaging surface disposed centrally between said opposed sides, and oppositely inclined walls between said cylinder engaging surface and said opposed sides.

HARRY M. BRAMBERRY.